(12) United States Patent
Borss et al.

(10) Patent No.: US 12,495,272 B2
(45) Date of Patent: Dec. 9, 2025

(54) APPARATUS AND METHOD FOR CONVERTING GEOMETRY DATA FOR AR/VR SYSTEMS

(71) Applicant: Fraunhofer-Gesellschaft zur Foerderung der angewandten Forschung e.V., Munich (DE)

(72) Inventors: Christian Borss, Erlangen (DE); Kahleel Porter Hassan, Erlangen (DE); Matthias Geier, Erlangen (DE); Sascha Disch, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 137 days.

(21) Appl. No.: 18/146,037

(22) Filed: Dec. 23, 2022

(65) Prior Publication Data

US 2024/0236607 A1 Jul. 11, 2024

(51) Int. Cl.
*H04S 7/00* (2006.01)
*G06T 17/20* (2006.01)

(52) U.S. Cl.
CPC .............. *H04S 7/305* (2013.01); *G06T 17/20* (2013.01); *H04S 7/302* (2013.01); *H04S 2400/11* (2013.01)

(58) Field of Classification Search
CPC ...... H04S 7/305; H04S 7/302; H04S 2400/11; G06T 17/20
See application file for complete search history.

(56) References Cited

U.S. PATENT DOCUMENTS

| | | | | |
|---|---|---|---|---|
| 9,122,053 | B2* | 9/2015 | Geisner | G06V 40/20 |
| 12,133,062 | B2* | 10/2024 | Lee | H04S 5/005 |
| 2015/0378019 | A1* | 12/2015 | Schissler | G06T 17/20 |
| | | | | 700/94 |
| 2020/0105282 | A1* | 4/2020 | Kim | H04R 5/04 |
| 2020/0411020 | A1* | 12/2020 | Laitinen | H04S 7/00 |
| 2021/0272576 | A1 | 9/2021 | Hatanaka et al. | |
| 2021/0287651 | A1 | 9/2021 | Eronen et al. | |
| 2022/0103962 | A1* | 3/2022 | Munoz | G06F 3/167 |
| 2022/0174447 | A1 | 6/2022 | Koppens | |

(Continued)

FOREIGN PATENT DOCUMENTS

WO 2022248620 A1 12/2022

OTHER PUBLICATIONS

ISO/IEC, "Third version of Text of Working Draft of RM0", JTC1/SC29/WG6 M61258, 8th WG6 meeting, Oct. 2022.

(Continued)

*Primary Examiner* — Jason R Kurr
(74) *Attorney, Agent, or Firm* — Perkins Coie LLP; Michael A. Glenn (57) ABSTRACT

An apparatus according to an embodiment. The apparatus comprises a receiving interface for receiving a plurality of spatial object representations of a plurality of spatial objects, wherein each of the plurality of spatial object representations is represented in at least one of two or more spatial representation domains. Moreover, the apparatus comprises a converter for converting one or more of the plurality of spatial object representations from a first one of the two or more spatial representation domains into a second one of the two or more spatial representation domains.

17 Claims, 3 Drawing Sheets

(56) References Cited

U.S. PATENT DOCUMENTS

2024/0420705 A1* 12/2024 Disch .................. G10L 19/008

OTHER PUBLICATIONS

MPEG-I 6DoF, "Working draft for the MPEG-I 6DoF (Unloaded in 2 parts)", Working draft for the MPEG-I 6DoF.

ISO/IEC, "Core Experiment on Binary Encoding of Early Reflection Metadata", ISO/IEC JTC1/SC29/WG6 M60434, 7th WG 6 meeting, Jul. 2022.

"Digital Audio Compression (AC-4) Standard; Part 2: Immersive and personalized audio", ETSI Draft Specification; 103 190-2, European Telecommunications Standards Institute (ETSI, vol. JTC BroadCAS EBU/CENELEC/ETSI on Broadcasting, No. V0.0.1 Jun. 7, 2017 (Jun. 7, 2017), pp. 1-198, XP014302878. Uploaded in 2 parts.

Borss, Christian, et al., "Thoughts on Efficient Encoding of Diffraction Metadata", 140. MPEG Meeting; Oct. 24, 2022-Oct. 28, 2022; Mainz; (Motion Picture Expert Group or ISO/IEC JTC1/SC29/WG11), No. m61263 Oct. 19, 2022 (Oct. 19, 2022), XP030305828.

Silzle, Andreas, et al., First version of Text of Working Draft of RM0, 138. MPEG Meeting; Apr. 25, 2022-Apr. 29, 2022; Online; (Motion Picture Expert Group or ISO/IEC JTC1/SC29/WG11), No. m59696 Apr. 20, 2022 (Apr. 20, 2022), XP030301903. Uploaded in 3 parts.

Sizzle, Andreas, et al., Second version of Text of MPEG-1 Audio Working Draft of RMO, 139. MPEG Meeting; Jul. 18, 2022-Jul. 22, 2022; Online; (Motion Picture Expert Group or ISO/IEC JTC1/SC29/WG11), No. m60435 Jul. 13, 2022 (Jul. 13, 2022), XP030303818. Uploaded in 3 parts.

* cited by examiner

APPARATUS AND METHOD FOR CONVERTING GEOMETRY DATA FOR AR/VR SYSTEMS

BACKGROUND OF THE INVENTION

The present invention relates to converting geometry data, and, in particular, to an apparatus and a method for converting geometry data for AR/VR Systems.

In AR/VR auralization systems, geometry data is used by different processing blocks that simulate different acoustical phenomena like reflection, occlusion, or diffraction. Said geometry data is being represented in different formats, for example, as various parametrizations of geometric primitives, as meshes, voxels or edge parameters, etc.

The signal processing blocks in the renderer, which simulate the corresponding audio effects, commonly use different formats of their input parameter representation of geometry data depending on the nature of their internal calculations. For example, for the early reflection signal processing block, it is favorable to transmit spheres or cylinders as geometric primitives described by center points and radii, while the diffraction signal processing block internally requires a mesh approximation for the implemented path finding algorithm.

For the above stated reason, for example in the current version of the MPEG-I working draft of RM0 (see [1]), geometry data is transmitted multiple times to meet the input parameter requirements of the different signal processing blocks. In addition to the geometric objects which are transmitted individually within the bitstream via meshes( ) and primitives( ) payloads, there is a combined static mesh used by the early reflection signal processing block. Furthermore, additional edge data is transmitted for the diffraction signal processing block. Overall, this leads to a highly redundant and inefficient representation of geometry data.

Moreover, the current working draft for the MPEG-I 6DoF Audio specification ("second draft version of RM1") uses a binary format for transmitting diffraction payload data. This binary format is not yet optimized for small bitstream sizes.

It would be highly beneficial if improved concepts for converting geometry data would be provided.

SUMMARY

An apparatus according to an embodiment is provided. The apparatus comprises a receiving interface for receiving a plurality of spatial object representations of a plurality of spatial objects, wherein each of the plurality of spatial object representations is represented in at least one of two or more spatial representation domains. Moreover, the apparatus comprises a converter for converting one or more of the plurality of spatial object representations from a first one of the two or more spatial representation domains into a second one of the two or more spatial representation domains.

Moreover, a method according to an embodiment is provided. The method comprises:

Receiving a plurality of spatial object representations of a plurality of spatial objects, wherein each of the plurality of spatial object representations is represented in at least one of two or more spatial representation domains. And:

Converting one or more of the plurality of spatial object representations from a first one of the two or more spatial representation domains into a second one of the two or more spatial representation domains.

Furthermore, a non-transitory computer-readable medium comprising a computer program for implementing the above-described method when being executed on a computer or signal processor is provided.

Some embodiments provide a unified, compact and efficient representation and transmission of geometry data used for 6DoF rendering.

In some embodiments, for compacting geometry data, the inventive apparatus or system uses a geometry data conversion block (converter) and additional metadata, which controls said conversion block. The data conversion may, e.g., be applied in the exact same manner on the encoder as well as on the decoder side, resulting in identical geometry data available in different formats for the different signal processing blocks.

Before embodiments of the present invention are described in detail using the accompanying figures, it is to be pointed out that the same or functionally equal elements are given the same reference numbers in the figures and that a repeated description for elements provided with the same reference numbers is omitted. Hence, descriptions provided for elements having the same reference numbers are mutually exchangeable.

DETAILED DESCRIPTION OF THE INVENTION

Figure 1:
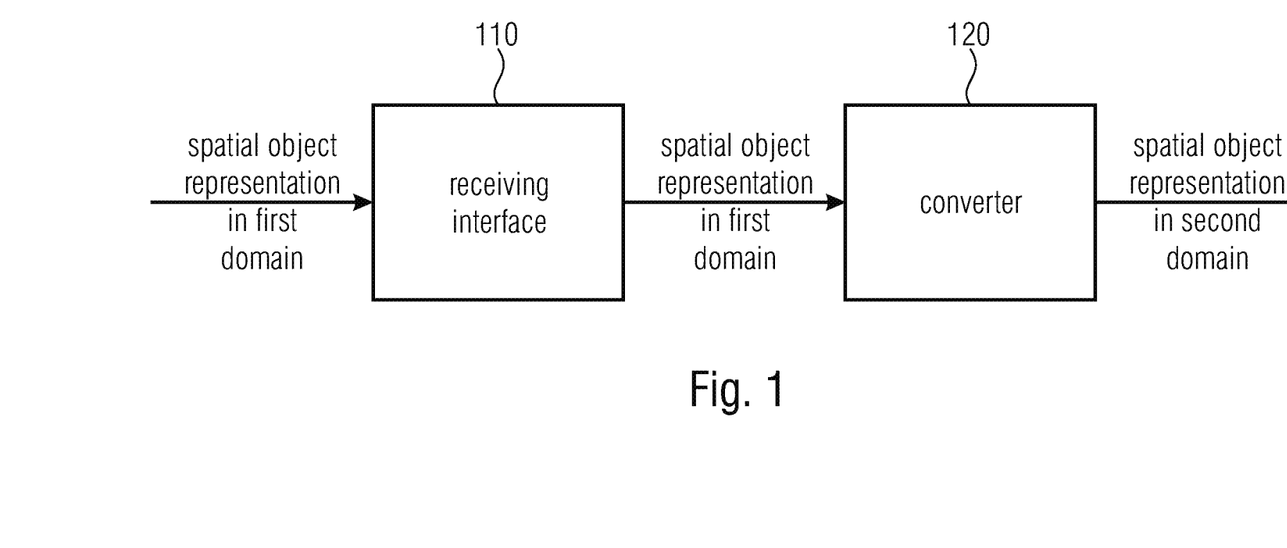
FIG. 1 illustrates an apparatus according to an embodiment for converting one or more spatial objects from a first spatial representation domain into a second spatial representation domain.

FIG. 1 illustrates an apparatus according to an embodiment.

The apparatus comprises a receiving interface 110 for receiving a plurality of spatial object representations of a plurality of spatial objects, wherein each of the plurality of spatial object representations is represented in at least one of two or more spatial representation domains.

Moreover, the apparatus comprises a converter 120 for converting one or more of the plurality of spatial object representations from a first one of the two or more spatial representation domains into a second one of the two or more spatial representation domains.

According to an embodiment, the converter 120 may, e.g., be configured to provide at least two spatial object representations for each of one or more of the plurality of objects.

In an embodiment, the receiving interface 110 may, e.g., be configured to receive a data stream comprising the plurality of spatial object representations of the plurality of spatial objects and comprising conversion decision information. The converter 120 may, e.g., be configured to select said one or more of the plurality of spatial object representations that are to be converted from the first one of the two or more spatial representation domains into the second one of the two or more spatial representation domains depending on the conversion decision information.

Figure 2:
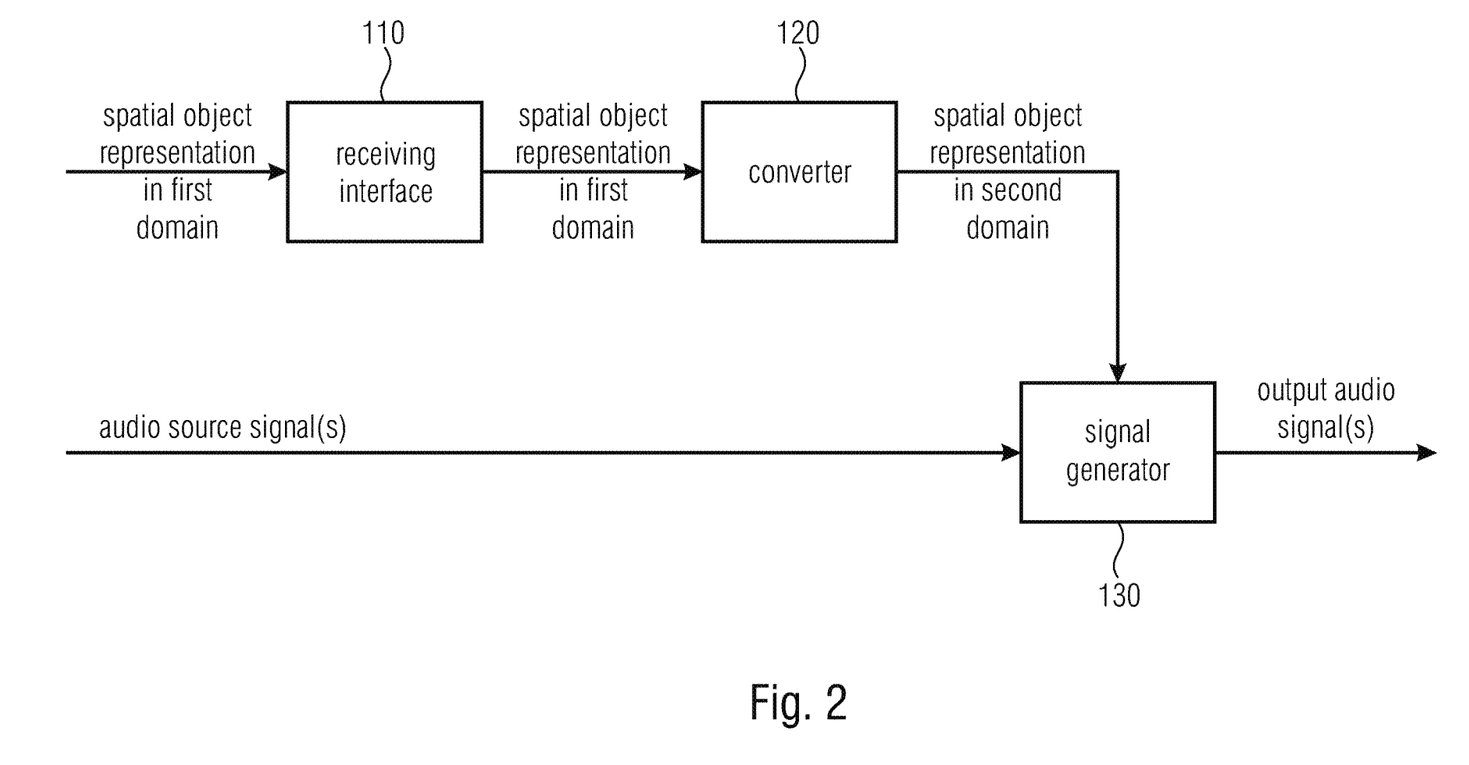
FIG. 2 illustrates an apparatus according to another embodiment, wherein the apparatus comprises a signal generator.

FIG. 2 illustrates an apparatus according to another embodiment, wherein the apparatus comprises a signal generator 130. The data stream may, e.g., comprise one or more audio source signals. The plurality of objects may, e.g., comprise at least one object, at which at least one audio source signal of the one or more audio source signals may, e.g., be reflected or diffracted. The converter 120 may, e.g., be configured to convert at least one spatial object representation of the at least one audio object from the first one of the two or more spatial representation domains into the second one of the two or more spatial representation domains. The signal generator 130 may, e.g., be configured for generating one or more audio output signals depending on the at least one audio source signal and depending on the at least one spatial object representation, being represented in the second one of the two or more spatial representation domains, of the at least one object, at which the at least one audio source signal may, e.g., be reflected or diffracted.

According to an embodiment, the converter 120 may, e.g., be configured to provide at least two spatial object representations for each of one or more of the plurality of objects. For determining the one or more audio output signals, the signal processor may, e.g., be configured to employ a first one of the at least two spatial object representations of each object of the one or more of the plurality of objects, to reproduce the effect of a reflection of at least one of the audio source signals at said object. Moreover, for determining the one or more audio output signals, the signal processor may, e.g., be configured to employ a second one of the at least two spatial object representations of each object of the one or more of the plurality of objects, to reproduce the effect of a diffraction of at least one of the audio source signals at said object.

In an embodiment, the converter 120 may, e.g., be configured to convert one or more of the plurality of spatial object representations from the first one of the two or more spatial representation domains, being different from a polygon mesh domain, into the second one of the two or more spatial representation domains, being the polygon mesh domain, wherein an object in the polygon mesh domain may, e.g., be represented by a polygon mesh, wherein the polygon mesh may, e.g., comprise a set of polygons which are connected with each other.

According to an embodiment, the polygon mesh domain may, e.g., be a triangle mesh domain, wherein an object in the triangle mesh domain may, e.g., be represented by a triangle mesh, wherein the triangle mesh may, e.g., comprise a plurality of triangles which are connected with each other.

In an embodiment, an object, being represented in the first one of the two or more spatial representation domains, being different from the polygon mesh domain, may, e.g., be represented by a single geometric primitive.

According to an embodiment, the single geometric primitive may, e.g., be three-dimensional.

In an embodiment, the polygon mesh domain may, e.g., be a triangle mesh domain, wherein an object in the triangle mesh domain may, e.g., be represented by a triangle mesh, wherein the triangle mesh may, e.g., comprise a plurality of triangles which are connected with each other. An object, being represented in the first one of the two or more spatial representation domains, being different from the polygon mesh domain, may, e.g., be represented by a single geometric primitive.

In an embodiment, the single geometric primitive which represents the object in the first one of the two or more spatial representation domains may, e.g., be at least one of a cube, a cuboid, a sphere, a pyramid, a cone, a cylinder and an ellipsoid.

Figure 3:
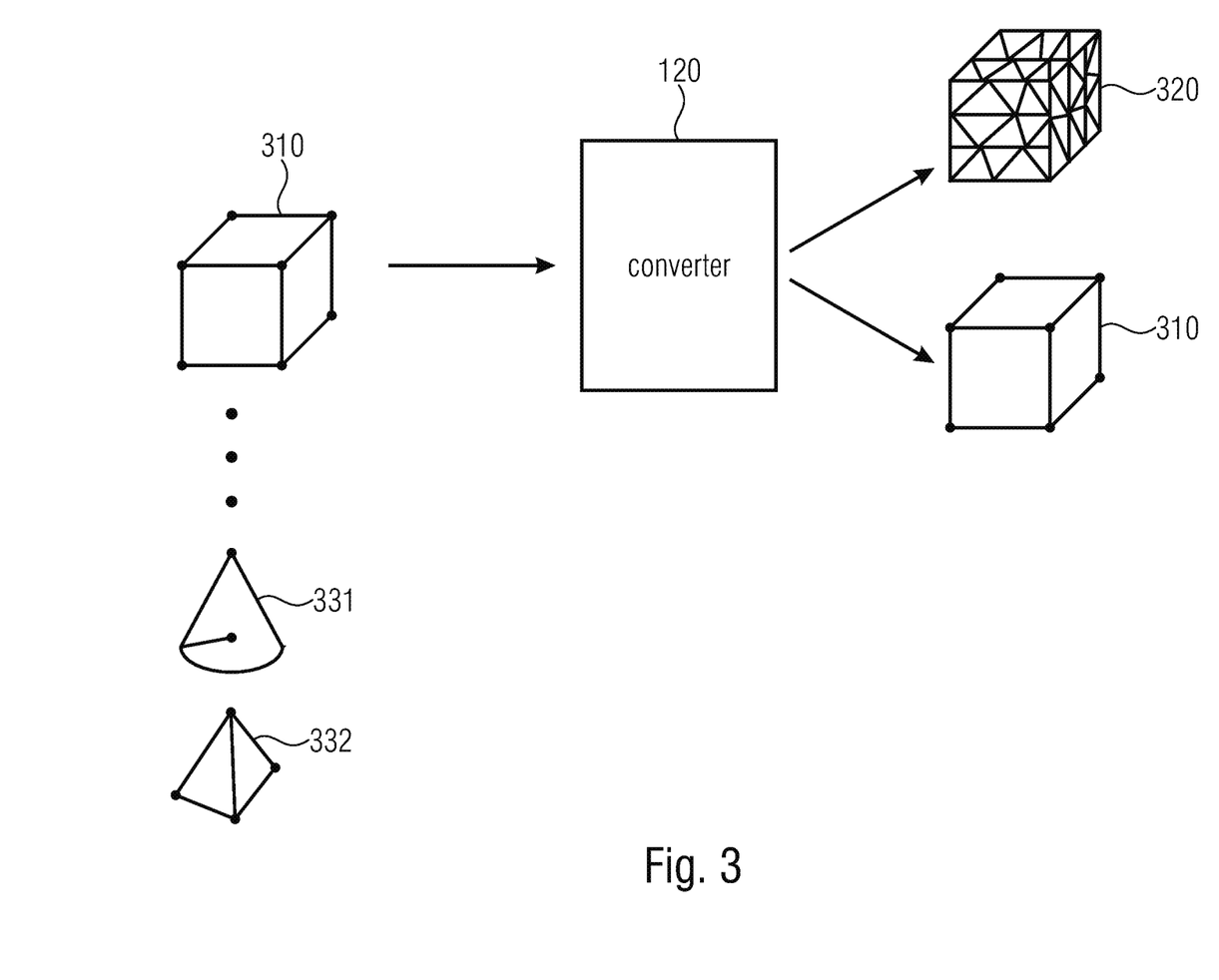
FIG. 3 illustrates an example application scenario for the converter 120 according to an embodiment.

FIG. 3 illustrates an example application scenario for the converter 120 according to an embodiment.

The converter may, for example, receive a spatial object representation of an object, here, a cuboid, being represented in a first spatial representation domain, here, a domain, where cuboid is represented as geometric primitives. The converter 120 converts the geometric primitive domain representation into a mesh domain representation 320 of the cuboid. The geometric primitive domain representation 310 of the cuboid may, e.g., be kept. Subsequently, the converter may, e.g., process a plurality of further spatial object representations 331, 332 of a plurality of further objects.

In some embodiments, information in the bitstream, for example, a bit, for example, a isEarlyReflectionPrimitive bit or a isEarlyReflectionMesh bit, may, e.g., indicate to the converter 120, whether the converter 120 has to convert a spatial object representation from a spatial representation domain into another spatial representation domain, or whether the spatial object representation is already in the desired spatial representation domain. For example, if an object is already represented in a desired domain, a transformation would not be necessary.

If both an encoder and a decoder comprise a same converter 120, the encoder can determine the properties of the spatial object representation in a particular spatial representation domain into which the converter 120 converts a spatial object representation of an object. For example, if the converter 120 converts a geometric primitive object into the triangle mesh domain comprising a plurality of triangles, the encoder can refer to particular triangles of the triangle mesh, e.g., by referring to one or more indices identifying a particular triangle of the triangle mesh, as the encoder has obtained from its converter 120 full knowledge on the triangle mesh that represents the object.

According to an embodiment, the converter 120 may, e.g., be configured to convert one or more of the plurality of spatial object representations from the first one of the two or more spatial representation domains, being different from a polygon mesh domain, into the second one of the two or more spatial representation domains, being the polygon mesh domain, wherein an object in the polygon mesh domain may, e.g., be represented by a polygon mesh, wherein the polygon mesh may, e.g., comprise a set of polygons which are connected with each other. The signal processor may, e.g., be configured to employ the spatial object representation in a spatial representation domain, being different from the polygon mesh domain, of each object of the one or more of the plurality of objects, to take the effect of the reflection of the at least one of the audio source signals at said object into account for determining the one or more audio output signals.

In an embodiment, the converter 120 may, e.g., be configured to convert one or more of the plurality of spatial object representations from the first one of the two or more spatial representation domains, being different from a polygon mesh domain, into the second one of the two or more spatial representation domains, being the polygon mesh domain, wherein an object in the polygon mesh domain may, e.g., be represented by a polygon mesh, wherein the polygon mesh may, e.g., comprise a set of polygons which are connected with each other. The signal processor may, e.g., be configured to employ the spatial object representation in the polygon mesh domain of each object of the one or more of the plurality of objects, to take the effect of the diffraction of the at least one of the audio source signals at said object into account for determining the one or more audio output signals.

According to an embodiment, the polygon mesh domain may, e.g., be a triangle mesh domain, wherein an object in the triangle mesh domain may, e.g., be represented by a triangle mesh, wherein the triangle mesh may, e.g., comprise a plurality of triangles which are connected with each other. The data stream may, e.g., comprise for an object of the plurality of objects information on a subset of the plurality triangles of the triangle mesh representing the object in the triangle mesh domain, wherein the subset of the plurality of triangles indicates those triangles having one or more vertices where at least one of the one or more audio source signals may, e.g., be diffracted. The signal processor may, e.g., be configured to employ the spatial object representation in the triangle mesh domain of the object, and to consider only vertices of the triangles of the subset of the plurality of triangles of the triangle mesh representing the object to take the effect of the diffraction of the at least one of the audio source signals at the object into account for determining the one or more audio output signals.

Now, particular embodiments are described:

According to some embodiments, instead of re-transmitting the whole static geometry, the meshes( ) and primitives( ) payloads are extended by the following flags:

| Syntax | No. of bits | Mnemonic |
|---|---|---|
| primitives( ) | | |
| { | | |
| primitivesCount = GetCountOrIndex( ); | | |
| for (int i = 0; i < primitivesCount; i++) { | 2 | uimsbf |
| primitiveType; | | |
| primitiveId = GetId( ); | | |
| [primitivePositionX; | | |
| primitivePositionY; | | |
| primitivePositionZ;] = GetPosition(isSmallScene) | | |
| [primitiveOrientationYaw; | | |
| primitiveOrientationPitch; | | |
| primitiveOrientationRoll] = GetOrientation( ); | | |
| primitiveCoordSpace; | 1 | bslbf |
| primitiveSizeX = GetDistance(isSmallScene); | | |
| primitiveSizeY = GetDistance(isSmallScene); | | |
| primitiveSizeZ = GetDistance(isSmallScene); | | |
| primitiveHasMaterial; | 1 | bslbf |
| if (primitiveHasMaterial) { | | |
| primitiveMaterialId = GetID( ); | | |
| } | | |
| primitiveHasSpatialTransform; | 1 | bslbf |
| if (primitiveHasSpatialTransform) { | | |
| primitiveHasAnchor; | 1 | bslbf |
| if (primitiveHasAnchor) { | | |
| primitiveParentAnchorId = GetID( ); | | |
| } | | |
| else { | | |
| primitiveParentTransformId = GetID; | | |
| } | | |
| } | | |
| isPrimitiveStatic; | 1 | bslbf |
| isEarlyReflectionPrimitive; | 1 | bslbf |
| } | | |
| } | | |
| meshes( ) | | |
| { | | |
| meshesCount = GetCountOrIndex( ); | | |
| for (int i = 0; i < meshesCount; i++) { | | |
| meshId = GetID( ); | 32 | uimsbf |
| meshCodedLength; | meshCodedLength | bslbf |
| meshFaces( ); | | |
| [meshPositionX; | | |
| meshPositionY; | | |
| meshPositionZ;] = GetPosition(isSmallScene) | | |
| [meshOrientationYaw; | | |
| meshOrientationPitch; | | |
| meshOrientationRoll;] = GetOrientation( ) | | |
| meshCoordSpace; | 1 | bslbf |
| meshHasSpatialTransform; | 1 | bslbf |
| if (meshHasSpatialTransform) { | | |
| meshHasAnchor; | 1 | bslbf |
| if (meshHasAnchor) { | | |
| meshParentAnchorId = GetID( ); | | |
| } | | |
| else { | | |
| meshParentTransformId = GetID( ); | | |
| } | | |
| } | | |
| isMeshStatic; | 1 | bslbf |
| isEarlyReflectionMesh; | | bslbf |
| } | | |
| } | | |

The static mesh and the static geometric primitives (spheres, cylinders, and boxes) for the early reflection signal processing block is reconstructed by the geometry data conversion block by concatenating all geometry data, which matches a pre-defined combination of isMeshStatic, isEarlyReflectionPrimitive, isEarlyReflectionMesh, and primitiveType. The static mesh for the diffraction signal processing block is reconstructed in a similar way by concatenating all geometry data which matches another pre-defined combination of these flags and values.

In an embodiment, since this conversion is done in the exact same manner on the encoder as well as on the decoder side, identical data is available on both sides of the transmission system. Hence both sides can use the same enumeration of surfaces and edges, if the same mesh approximation is used for the geometric primitives. This approximation can be implemented by pre-defined tables for the mesh vertices and triangle definitions, or by means of an algorithm that generates this mesh data.

Some embodiments provide a unified, compact and efficient representation and transmission of geometry data. The proposed system adds only little control metadata to the bitstream while avoiding re-transmission of large parts of the geometry data contained in the bitstream. This results in significant saving of total bitstream size while transmitting the same information.

VR/AR transmission systems, e.g. MPEG-I, commonly use different formats of their input parameter representation of geometry data for their individual rendering stages. This leads to an inefficient representation and transmission of geometry data. The invention proposes to unify the geometry data format used in a VR/AR transmission system.

In a preferred embodiment, MPEG-I encoder and decoder are extended by a geometry data converter, and a small amount of additional metadata is added to the transmitted bitstream while saving large amounts of redundant data.

In the following, specific embodiments of the present invention are described in more detail.

Now, geometry data conversion according to particular embodiments is described:

Regarding geometry data conversion according to embodiments, the Early Reflection Stage and the Diffraction Stage have different requirements on the format of the geometry data (numbering of triangles/edges and usage of primitives). For this reason, geometry data is currently transmitted several times. In addition to the geometry data of the individual geometric objects, there is a concatenated static mesh for the Early Reflection Stage and vertex data is transmitted a third time in diffractionPayload( ).

In order to avoid the redundant multiple transmission of geometry data, we introduce a geometry data converter which provides the geometry data in the needed format. The static mesh and the static geometric primitives (spheres, cylinders, and boxes) for the early reflection signal processing block is reconstructed by the geometry data conversion block by concatenating all geometry data, which matches a pre-defined combination of the bitstream elements isMeshStatic and primitiveType and the newly introduced bitstream elements isEarlyReflectionPrimitive and isEarlyReflectionMesh. The static mesh for the Diffraction Stage is reconstructed in a similar way by concatenating all geometry data which matches another pre-defined combination of these flags and values.

Since this conversion is done in the exact same manner on the encoder as well as on the decoder side, identical data is available on both sides of the transmission system. Hence both sides can use the same enumeration of surfaces and edges, if the same mesh approximation is used for the geometric primitives. This approximation is implemented by pre-defined tables for the mesh vertices and triangle definitions.

In the following, voxel coordinate prediction according to particular embodiments is described.

Regarding Voxel Coordinate Prediction according to embodiments, the RM1+ encoder does not encode the voxel data in random order. Instead, the voxel data is serialized by iterating over one or more regions and for each region iterating over its x-, y-, and z-coordinates.

```
for (bbox : region_bounding_boxes) {
    for (int x = bbox.x0; x <= bbox.x1; x++) {
        for (int y = bbox.y0; y <= bbox.y1; y++) {
            for (int z = bbox.z0; z <= bbox.z1; z++) {
                if (has_voxel_data (x, y, z)) {
                    bitstream.append( serialize_voxel_data (x, y, z) ) ;
                }
            }
        }
    }
}
```

Consequently, the voxel coordinates [x, y, z] are mostly predictable and a voxel coordinate predictor can be used to reduce the redundancy of the transmitted data. Due to the huge number of voxel coordinates within diffractionPayload ( ) and their representation by three 16 bit integer values, a significant saving of bitstream size can be achieved.

The predictor assumes that only the z-axis component is increased. If this is not the case, he assumes that additionally only the y-axis value is increased. If this is also not the case, he assumes that additionally the x-axis value is increased:

```
payloadWithVoxelCoordinatePrediction( )
{
    x = -1;
    y = -1;
    z = -1;
    codebookVcX = genericCodebook( );
    codebookVcY = genericCodebook( );
    codebookVcZ = genericCodebook( );
    numberOfListenerVoxels;
    for (int i = 0; i < numberOfListenerVoxels; i++) {
        z += 1;
        hasVoxelCoordZ;
        if (hasVoxelCoordz) {
            z = codebookVcZ.get_symbol( );
            y += 1;
            hasVoxelCoordY;
            if (hasVoxelCoordY) {
                y = codebookVcY.get_symbol( );
                x += 1;
                hasVoxelCoordX;
                if (hasVoxelCoordX) {
                    x = codebookVcX.get_symbol( );
                }
            }
        }
        listenerVoxelGridIndexX[i] = x;
        listenerVoxelGridIndexY[i] = y;
        listenerVoxelGridIndexZ[i] = z;
        numberOfVoxelDataEntries;
        for (int j = 0; j < numberOfVoxelDataEntries; j++) {
            voxelData[i][j] = getVoxelData( );
        }
    }
}
```

As hasVoxelCoordZ is 0 in most cases, only a single bit is required in most cases for transmitting the voxel coordinates [x, y, z].

Regarding techniques to reduce the payload size, the following techniques (or a subgroup thereof) may, e.g., be applied according to embodiments to reduce the payload size. The techniques comprise:

Geometry data conversion: (see the general explanations above or the particular examples below): Geometry data of geometric objects are transmitted only once, and embodiments introduce a geometry data converter is introduced which generates different variants of this data for the Early Reflection Stage and the Diffraction Stage.

Voxel coordinate prediction: (see the general explanations above or the particular examples below): Embodiments introduce a voxel coordinate predictor is introduced which predicts consecutively transmitted voxel coordinates.

Entropy Coding: The generic codebook encoding schema introduced in m60434 (see [2]) is used for entropy coding of data series.

Inter-voxel redundancy reduction: The differential voxel data encoding schema introduced in m60434 is utilized to exploit the similarity of neighbor voxel data.

Data consolidation: Bitstream elements which are redundant and can be derived by the decoder from other bitstream elements are removed.

Quantization: Quantization with configurable quantization accuracy is used to replace single precision floating point values. With 24 bit quantization, the quantization error is comparable to the accuracy of the former single precision floating point values.

Regarding entropy coding, for bitstream elements which are embedded in loops, mostly the Generic Codebook technique, for example, introduced in m60434 may, e.g., be used.

Compared to the entropy encoding method realized by the writeCountOrIndex( ) function, generic codebooks provide entropy encoding tailored for the given series of symbols.

Regarding Inter-Voxel Redundancy Reduction, due to the structural similarity of the voxel data, the inter-voxel redundancy reduction method introduced in m60434 for early reflection voxel data is also applicable for diffrListenerVoxelDict( ) and diffrValidPathDict( ) This method transmits the differences between neighbor voxel data using a list of removal indices and a list of added voxel data elements.

Regarding Data Consolidation, most of the bitstream elements of diffrEdges( ) can be reconstructed by the decoder from a small sub-set of these elements. By removing the redundant elements, a significant saving of bitstream size can be achieved.

Regarding Quantization, the payload components diffrStaticPathDict( ) and diffrDynamicPaths( ) contain a bitstream element "angle" which is encoded in RM1+ as 32-bit single precision floating point value. By replacing these bitstream elements by quantized integer values with entropy encoding using the Generic Codebook method, a significant saving of bitstream size can be achieved. The quantization accuracy can be selected using the newly added "numBitsForAngle" bitstream element. With numBitsForAngle=24 as chosen in our experiments, the quantization error is in the same range as a single precision floating point value.

As outlined above, the current working draft for the MPEG-I 6DoF Audio specification ("second draft version of RM1") uses a binary format for transmitting diffraction payload data. This binary format is not yet optimized for small bitstream sizes. Embodiments replace this binary format by an improved binary format which results in significantly smaller bitstream sizes.

In the following, proposed changes to the current working draft for the MPEG-I 6DoF Audio specification ("second draft version of RM1") text are provided:

By applying embodiments, a substantial reductions of the size of the diffraction payload can be achieved as shown below.

The encoding method presented in this Core Experiment is meant as a replacement for major parts of diffractionPayload( ) The corresponding payload handler in the reference software for packets of type PLD_DIFFRACTION is meant to be replaced accordingly.

Furthermore, the meshes( ) and primitives( ) syntax is meant to be extended by an additional flag and the reference software is meant to be extended by a geometry data converter (within the SceneState component in the renderer).

The proposed changes to the working draft text are specified in the following sections.

Strikethrough text is used to mark text that shall be removed in the current working draft.

Syntax→Diffraction payload syntax

In Section "6.2.4—Diffraction payload syntax" of the Working Draft, the syntax definitions shall be changed as follows:

TABLE XXX

Syntax of diffractionPayload( )

| Syntax | No. of bits | Mnemonic |
|---|---|---|
| diffractionPayload( ) | | |
| { | | |
|   diffrVoxelGrid( ); | | |
|   diffrStaticEdgeList( ); | | |
|   diffrStaticPathDict( ); | | |
|   diffrListenerVoxelDict( ); | | |
|   diffrSourceVoxelDict( ); | | |
|   diffrValidPathDict( ); | | |
|   diffrDynamicEdges( ); | | |
|   diffrDynamicPaths( ); | | |
| } | | |

TABLE XXX

Syntax of diffrVoxelGrid( )

| Syntax | No. of bits | Mnemonic |
|---|---|---|
| diffrVoxelGrid( ) | | |
| { | | |
|   [diffrVoxelOriginX; | | |
|   diffrVoxelOriginY; | | |
|   diffrVoxelOriginZ;] = GetPosition(isSmallScene) | | |
|   diffrVoxelPitchX = GetDistance(isSmallScene); | | |
|   diffrVoxelPitchY = GetDistance(isSmallScene); | | |
|   diffrVoxelPitchZ = GetDistance(isSmallScene); | | |
|   diffrVoxelShapeX = GetID( ); | | |
|   diffrVoxelShapeY = GetID( ); | | |
|   diffrVoxelShapeZ = GetID( ); | | |
| } | | |

TABLE XXX

Syntax of diffrStaticEdgeList( )

| Syntax | No. of bits | Mnemonic |
|---|---|---|
| diffrStaticEdgeList( ) { | | |
|   diffrHasStaticEdgeData; | 1 | Uimsbf |
|   if (diffrHasStaticEdgeData) { | | |
|     codebookEdgeID = genericCodebook( ); | | |
|     codebookVtxID = genericCodebook( ); | | |
|     codebookTriID = genericCodebook( ); | | |
|     numberOfStaticEdges | | |
|     for (int i = 0; i < numberOfStaticEdges; i++){ | | |
|       staticEdge[i] = diffrEdges(codebookEdgeID, codebookVtxID, | | |
|         codebookTriID); | | |
|     } | | |
|   } | | |
| } | | |

TABLE XXX

Syntax of diffrEdge ( )

| Syntax | No. of bits | Mnemonic |
|---|---|---|
| diffrEdge(codebookEdgeID, codebookVtxID, codebookTriID) { | | |
| edgeId = codebookEdgeID.get_symbol( ); | | Vlclbf |
| edgeVertexId1 = codebookVtxID.get_symbol( ); | | Vlclbf |
| edgeVertexId2 = codebookVtxID.get_symbol( ) | | Vlclbf |
| edgeAdjacentTriangleID1 = codebookTriID.get_symbol( ); | | Vlclbf |
| edgeAdjacentTriangleID2 = codebookTriID.get_symbol( ); | | Vlclbf |
| edgeIsRounded; | 1 | uimsbf |
| edgeIsRelevant; | 1 | uimsbf |
| } | | |

TABLE XXX

Syntax of diffrStaticPathDict( )

| Syntax | No. of bits | Mnemonic |
|---|---|---|
| diffrStaticPathDict( ) { | | |
|   diffrHasStaticPathData; | 1 | uimsbf |
|   if (diffrHasStaticPathData) { | | |
|     staticPathDict = diffrPathDict( ); | | |
|   ) | | |
| } | | |

TABLE XXX

Syntax of diffrPathDict( )

| Syntax | No. of bits | Mnemonic |
|---|---|---|
| diffrPathDict( ) } | | |
|   codebookEdgeIDSeqLen = genericCodebook( ); | | |
|   codebookEdgeIDSeq = genericCodebook( ); | | |
|   codebookAngleSeq = genericCodebook( ); | | |
|   numBitsForAngle; | 6 | uimsbf |
|   numberOfRelevantEdges = GetID( ); | | |
|   for (int i = 0; i < numberOfRelevantEdges; i++){ | | |

TABLE XXX-continued

Syntax of diffrPathDict( )

| Syntax | No. of bits | Mnemonic |
|---|---|---|
|     numberOfPaths = GetID( ); | | |
|     for (int j = 0; j < numberOfPaths; j++){ | | |
|       numberOfEdgesInPath = | | vlcbf |
|         codebookEdgeIDSeqLen.get_symbol( ); | | |
|       for (int k = 0; i < numberOfEdgesnPath; k++){ | | |
|         edgeId[i][j][k] = codebookEdgeIDSeq.get_symbol( ); | | vlcbf |
|         faceIndicator[i][j][k]; | 1 | uimsbf |
|         angle[i][j][k] = codebookAngleIDSeq.get_symbol( ); | | vlcbf |
|       } | | |
|     } | | |
|   } | | |
| } | | |

TABLE XXX

| Syntax | No. of bits | Mnemonic |
|---|---|---|
| diffrListenerVoxelDict( ) { | | |
|   diffrHasListenerVoxelData; | 1 | uimsbf |
|   if (diffrHasListenerVoxelData){ | | |
|     x = −1; | | |
|     y = −1; | | |
|     z = −1; | | |
|     codebookVcX = genericCodebook( ); | | |
|     codebookVcY = genericCodebook( ); | | |
|     codebookVcZ = genericCodebook( ); | | |
|     codebookNumEdges = genericCodebook( ); | | |
|     codebookEdgeId = genericCodebook( ); | | |
|     codebookIndicesRemoved = genericCodebook( ); | | |
|     numberOfListenerVoxels | | |
|     for (int i = 0; i < numberOfListenerVoxels; i++){ | | |
|       z += 1; | | |
|       hasVoxelCoordZ; | 1 | uimsbf |
|       if (hasVoxelCoordZ){ | | |
|         z = codebookVcZ.get_symbol( ); | | vlclbf |
|         y += 1; | | |
|       hasVoxelCoordY; | 1 | uimsbf |
|       if (hasVoxelCoordY){ | | |
|         y = codebookVcY.get_symbol( ); | | vlclbf |
|         x += 1; | | |
|       hasVoxelCoordX; | 1 | uimsbf |
|       if (hasVoxelCoordX){ | | |
|         x = codebookVcX.get_symbol( ); | | vlclbf |
|   codebookVcX.get_symbol( ); | | |
|       } | | |
|     } | | |
|   } | | |
|   listenerVoxelGridIndexX[i] = x; | | |
|   listenerVoxelGridIndexY[i] = y; | | |
|   listenerVoxelGridIndexZ[i] = y; | | |
|   diffrVoxelListenerMode[i]; | 2 | uimsbf |
|   bool remove_loop = diffrListenerVoxelMode[i] != 0; | | |
|   int k = 0; | | |
|   while (remove loop){ | | |
|     diffrListenerVoxelIndexDiff[i][k] = codebookIndicesRemoved.get_symbol( ); | | vlclbf |
|     remove_loop = diffrListenerVoxelIndexDiff[i][k] != 0; | | |
|     k += 1; | | |
|   } | | |

TABLE XXX-continued

| Syntax | No. of bits | Mnemonic |
|---|---|---|
| numberOfEdgesAdded=codebookNumEdges.get_symbol( );<br>  for (int j = 0; j < numberOfEdgesAdded; j++){<br>    diffrListenerVoxelEdge[i][j] = codebookEdgeId.get_symbol( );<br>  }<br>  }<br>  }<br>} | | vlclbf<br><br>vlclbf |

TABLE XXX

Syntax of diffrSourceVoxelDict( )

| Syntax | No. of bits | Mnemonic |
|---|---|---|
| diffrSourceVoxelDict( )<br>{<br>  diffrHasSourceVoxelData;<br>  if (diffrHasSourceVoxelData){<br>    numberOfStaticSources = GetId( );<br>    for (int i = 0; i < numberOfStaticSources; i++){<br>      staticSourceId = GetID( );<br>      numberOfVoxelsPerStaticSource = GetId( );<br>      for (int j = 0; j < numberOfVoxelsPerStaticSource; j++){<br>        sourceVoxelGridIndexX[i][j] = GetId( );<br>        sourceVoxelGridIndexY[i][j] = GetId( );<br>        sourceVoxelGridIndexZ[i][j] = GetId( );<br>        numberOfEdgesPerSourceVoxel = GetId( );<br>        for (int k = 0; k < numberOfEdgesPerSourceVoxel; k++){<br>          source VisibleEdgeId[i][j][k] = GetID( );<br>        }<br>      }<br>    }<br>  }<br>} | 1 | uimsbf |

TABLE XXX

Syntax of diffrValidPathDict( )

| Syntax | No. of bits | Mnemonic |
|---|---|---|
| diffrValidPathDict( )<br>{<br>  diffrHasValidPathData;<br>  if (diffrHasValidPathData){<br>    numberOfValidStaticSources = GetID( );<br>    for (int i = 0; i < numberOfValidStaticSources; i++){<br>      ValidStaticSourceId = GetID( );<br>      x = −1<br>      y = −1<br>      y = −1<br>      codebookVcX = genericCodebook( );<br>      codebookVcY = genericCodebook( );<br>      codebookVcZ = genericCodebook( );<br>      codebookNumPaths = genericCodebook( );<br>      codebookEdgeId = genericCodebook( );<br>      codebookIndicesRemoved = genericCodebook( );<br>      numberOfMaximumListenerVoxels = GetID( );<br>      for (int j = 0; j < numberOfMaximumListenerVoxels; j++){<br>        z += 1;<br>        hasVoxelCoordZ;<br>        if (hasVoxelCoordZ){<br>          z = codebookVcZ.get_symbol( );<br>          y += 1; | 1 | uimsbf<br><br><br><br><br><br><br><br><br><br><br><br><br><br><br><br><br><br>1<br><br><br>vlclbf |

TABLE XXX-continued

Syntax of diffrValidPathDict( )

| Syntax | No. of bits | Mnemonic |
|---|---|---|
| hasVoxelCoordY;<br>        if (hasVoxelCoordY){<br>          y = codebookVcY.get_symbol( );<br>          x += 1;<br>        hasVoxelCoordX;<br>          x = codebookVcX.get_symbol( );<br>        }<br>      }<br>    }<br>    validListenerVoxelGridIndexX[i][j] = x;<br>    validListenerVoxelGridIndexY[i][j] = x;<br>    validListenerVoxelGridIndexZ[i][j] = x;<br>    diffrValidPathMode[i][j];<br>    bool remove_loop = diffrValidPathMode[i][j] != 0;<br>    int k = 0;<br>    while (remove_loop){<br>      diffrValidPathIndexDiff[i][j][k] = codebookIndicesRemoved.get_symbol( );<br>      remove_loop = diffrValidPathIndexDiff[i][j][k];<br>      k += 1;<br>    }<br>    numberofPathsAdded = codebookNumPaths.get_symbol( );<br>    for (int k = 0; k < numberOfPathsAdded; k++){ | 1<br><br><br><br>1<br><br><br><br><br><br><br><br>2 | uimsbf<br><br>vlclbf<br><br><br>uimsbf<br><br><br><br><br><br><br>uimsbf<br><br><br><br>vlclbf<br><br><br><br><br>vlclbf |

TABLE XXX-continued

Syntax of diffrValidPathDict( )

| Syntax | No. of bits | Mnemonic |
|---|---|---|
|         diffrValidPathEdge[i][j][k] = codebookEdgeId.get_symbol( );<br>        diffrValidPathEdge[i][j][k] = codebookPathId.get_symbol( );<br>      }<br>    }<br>  }<br>}<br>} | | vlclbf |

TABLE XXX

Syntax of diffrDynamicEdges( )

| Syntax | No. of bits | Mnemonic |
|---|---|---|
| diffrDynamicEdges( )<br>{<br>  diffrHasDynamicEdgeData;<br>  if (diffrHasDynamicEdgeData) {<br>    dynamicGeometryCount = GetID( );<br>    for (int i = 0; i < dynamicGeometryCount, i++){<br>      geometryId[i] = GetID( );<br>      codebookEdgeID = genericCodebook( );<br>      codebookVtxID = genericCodebook( );<br>      codebookTriID = genericCodebook( );<br>      dynamicEdgesCount = GetID( );<br>      for (int j = 0; j < dynamicEdgesCount, j++)<br>{<br>        dynamicEdge[i][j] = diffrEdges(codebookEdgeID,<br>          codebookVtxID, coddebookTriID);<br>      }<br>    }<br>  }<br>} | 1 | uimsbf |

TABLE XXX

Syntax of diffrDynamicPaths( )

| Syntax | No. of bits | Mnemonic |
|---|---|---|
| diffrDynamicPaths( )<br>{<br>  diffrHasDynamicPathData;<br>  if (diffrHasDynamicPathData) {<br>    dynamicGeometryCount = GetID( );<br>    for (int g = 0; g < dynamicGeometryCount; g++){ | 1 | uimsbf |

TABLE XXX-continued

Syntax of diffrDynamicPaths( )

| Syntax | No. of bits | Mnemonic |
|---|---|---|
|       relevantGeometryId = GetID( );<br>      dynamicPathDict[g] = diffrPathDict( );<br>    }<br>  }<br>} | | |

Syntax→Scene plus payload syntax

In Section "6.2.11—Scene plus payload syntax" of the Working draft, the following tables shall be extended:

TABLE XXX

Syntax of primitives( )

| Syntax | No. of bits | Mnemonic |
|---|---|---|
| primitives( )<br>{<br>  primitivesCount = GetCountOrIndex( );<br>  for (int i = 0; i < primitivesCount; i++) {<br>    primitiveType;<br>    primitiveId = GetId( );<br>    [primitivePositionX;<br>    primitivePositionY;<br>    primitivePositionZ;] = GetPosition(isSmallScene)<br>    [primitiveOrientationYaw;<br>    primitiveOrientationPitch;<br>    primitiveOrientationRoll] = GetOrientation( );<br>    primitiveCoordSpace;<br>    primitiveSizeX = GetDistance(isSmallScene);<br>    primitiveSizeY = GetDistance(isSmallScene);<br>    primitiveSizeZ = GetDistance(isSmallScene);<br>    primitiveHasMaterial;<br>    if (primitiveHas Material) {<br>      primitiveMaterialId = GetID( );<br>    }<br>    primitiveHasSpatialTransform;<br>    if (primitiveHasSpatialTransform) {<br>      primitiveHasAnchor;<br>      if (primitive HasAnchor) {<br>        primitiveParentAnchorId = GetID( );<br>      }<br>      else {<br>        primitiveParentTransformId = GetID;<br>      }<br>    }<br>  PrimitiveStatic;<br>    isEarlyReflectionPrimitive;<br>  }<br>} | <br><br><br><br>2<br><br><br><br><br><br><br><br><br><br>1<br><br><br><br>1<br><br><br><br>1<br><br>1<br><br><br><br><br><br><br><br>1<br>1 | <br><br><br><br>uimsbf<br><br><br><br><br><br><br><br><br><br>bslbf<br><br><br><br>bslbf<br><br><br><br>bslbf<br><br>bslbf<br><br><br><br><br><br><br><br>bslbf<br>bslbf |

TABLE XXX

Syntax of meshes( )

| Syntax | No. of bits | Mnemonic |
|---|---|---|
| meshes( )<br>{<br>  meshesCount = GetCountOrIndex( );<br>  for (int i = 0; i < meshesCount; i++) {<br>    meshId = GetID( );<br>    meshCodedLength;<br>    meshFaces( );<br>    [meshPositionX;<br>    meshPositionY;<br>    meshPositionZ;] = GetPosition(isSmallScene)<br>    [meshOrientationYaw; | <br><br><br><br>32<br>meshCodedLength | <br><br><br><br>uimsbf<br>bslbf |

TABLE XXX-continued

Syntax of meshes( )

| Syntax | No. of bits | Mnemonic |
|---|---|---|
| meshOrientationPitch;<br>meshOrientationRoll;] = GetOrientation( ) | | |
| meshCoordSpace; | 1 | bslbf |
| meshHasSpatialTransform; | 1 | bslbf |
| if (meshHasSpatialTransform) { | | |
|   meshHasAnchor; | 1 | bslbf |
|   if (meshHasAnchor) { | | |
|     meshParentAnchorId = GetID( ); | | |
|   } | | |
|   else { | | |
|     meshParentTransformId = GetID( ); | | |
|   } | | |
| } | | |
| isMeshStatic; | 1 | bslbf |
| isMeshStatic; | 1 | bslbf |
| } | | |
| } | | |

Data Structure→Renderer Payloads→Geometry

To be amended: New section "6.3.2.1.2 Static geometry for Early Reflection and Diffraction Stage".

Data Structure→Renderer Payloads→Diffraction Payload Data Structure

To be amended: Section "6.3.2.3—Diffraction payload data structure".

Data Structure→Renderer Payloads→Scene Plus Payload Data Structure

In Section "6.3.2.10-Scene plus payload data structure" following descriptions shall be added:

| | |
|---|---|
| [. . .] | |
| isPrimitiveStatic | This flag indicates is the primitive is static or dynamic. If static, then the primitive is stationary throughout the entire duration of the scene, whereas the position of the primitive could be updated if it is dynamic. |
| isEarlyReflectionPrimitive | This flag indicates if the primitive is added by the geometry data converter to the static mesh for the Early Reflection Stage. |
| meshesCountThis | value is the number of meshes in this payload. |
| [. . .] | |
| isMeshStatic | This flag indicates is the mesh is static or dynamic. If static, then the mesh is stationary throughout the entire duration of the scene, whereas the position of the mesh could be updated if it is dynamic. |
| isEarlyReflectionMesh | This flag indicates if the mesh is added by thegeometry data converter to the static mesh for the Early Reflection Stage. |
| environmentsCount | This value represents the number of acoustic environments in this payload. |
| [. . .] | |

It is noted that the runtime complexity of the renderer is not affected by the proposed changes.

In the following, test results are considered.

Evidence for the merit of this method is given below (see Table 2 and Table 3). In the Hospital scene as representative example, there are 95520 edgesInPathCount bitstream elements in diffrStaticPathDict( ) resulting in total in 568708 bits for these bitstream elements when writeCountOrIndex( ) is used. When using the Generic Codebook technique only 32 bits for the codebook config and 169611 bits for the encoded symbols are needed for encoding the same data. In diffrDynamicPaths( ) the edgesinPathCount bitstream element sums up to 15004 bits in total when using writeCountOrIndex( ) for the same scene vs. 160+6034=6194 bits when using the Generic Codebook technique.

Escaped integer values provided by the function writeID( ) are used for less frequently transmitted bitstream elements to replace fixed-length integer values.

The Core Experiment is based on RM1+, i.e. RM1 including the m60434 contribution (see [2]) which was accepted for being merged into the v23 reference model. The necessity of using this pre-release version comes from the fact that this Core Experiment utilizes the encoding techniques introduced in m60434.

In order to verify that the proposed method works correctly and to prove its technical merit, all "Test 1" and "Test 2" scenes were encoded and compared the size of the diffraction metadata with the encoding result of the RM1+ encoder.

For all "Test 1" and "Test 2" scenes, the proposed encoding method provides on average a reduction of 55.20% in overall bitstream size over RM1+. Considering only scenes with diffracting mesh data, the proposed encoding method provides on average a reduction of 73.53% in overall bitstream size over RM1+.

Regarding data compression, Table 1 lists the size of diffractionPayload( ) for the RM1+ encoder ("old size/bits") and the proposed encoding method ("new size/bits"). The last column lists the achieved compression ratio, i.e. the ratio of the old and the new payload size.

In all cases the proposed method results in smaller payload sizes. For all scenes with diffracting scene objects that generate diffracted sound, i.e. scenes with mesh data, a compression ratio greater than 2.85 was achieved. For the largest scenes ("Park" and "Recreation") compression ratios of 19.35 and 36.11 were achieved.

TABLE 1 size comparison of diffractionPayload( )

| Scene | old size/bits | new size/bits | compression ratio |
|---|---|---|---|
| ARBmw | 290 | 97 | 2.99 |
| ARHomeConcert_Test1 | 299 | 106 | 2.82 |
| ARPortal | 156311 | 24649 | 6.34 |
| Battle | 1231043 | 409843 | 3.00 |
| Beach | 299 | 106 | 2.82 |
| Canyon | 7376196 | 1592252 | 4.63 |

TABLE 1-continued size comparison of diffractionPayload( )

| Scene | old size/bits | new size/bits | compression ratio |
|---|---|---|---|
| Cathedral | 50801985 | 2968271 | 17.12 |
| DowntownDrummer | 1847318 | 199428 | 9.26 |
| GigAdvertisement | 290 | 97 | 2.99 |
| Hospital | 26262049 | 9205292 | 2.85 |
| OutsideHOA | 427631 | 27905 | 15.32 |
| Park | 115256140 | 3192053 | 36.11 |
| ParkingLot | 6854907 | 503082 | 13.63 |
| Recreation | 182289810 | 9421775 | 19.35 |
| SimpleMaze | 4504068 | 455236 | 9.89 |
| SingerInTheLab | 2456 | 315 | 7.80 |
| SingerInYourLab_small | 290 | 97 | 2.99 |
| VirtualBasketball | 1878590 | 88696 | 21.18 |
| VirtualPartition | 19102 | 2128 | 8.98 |

Table 2 and Table 3 summarize how many bits were spent in the Hospital scene for the bitstream elements of the diffrStaticPathDict( ) payload component. Since this scene can be regarded as a benchmark scene for diffraction, it is of special relevance. In RM1+ the "angle" bitstream element is responsible for more than 50% of the diffrStaticPathDict( ) payload component size in the Hospital scene. With 24 bit quantization for a comparable accuracy and Generic Codebook entropy encoding, the size of the diffrStaticPathDict( ) payload component can be significantly reduced as shown in Table 3. Please note that the labels given by the encoder are used to name the bitstream elements and that these may deviate from the bitstream element labels defined above.

TABLE 2 diffrStaticPathDict( ) payload component of
Hospital scene, RM1+ encoder

| Bitstream element | Type | Number | Bits total |
|---|---|---|---|
| relevantEdgeCount | UnsignedInteger | 1 | 16 |
| pathCount | UnsignedInteger | 1103 | 17648 |
| pathId | writeID | 95520 | 2160384 |
| edgesInPathCount | writeCountOrIndex | 95520 | 568708 |
| edgeId | writeID | 401303 | 6108928 |
| faceIndicator | UnsignedInteger | 401303 | 802606 |
| angle | Float32 | 401303 | 12841696 |
| TOTAL | | | 22499986 |

TABLE 3 diffrStaticPathDict( ) payload component of Hospital scene,
proposed encoder

| Bitstream element | Type | Number | Bits total |
|---|---|---|---|
| hasStaticPathsData | Flag | 1 | 1 |
| codebookEdgeIDSeqLen | CodebookConfig | 1 | 32 |
| codebookEdgeIDSeq | CodebookConfig | 1 | 14346 |
| codebookAngleSeq | CodebookConfig | 1 | 419387 |
| numBitsAngle | UnsignedInteger | 1 | 6 |
| relevantEdgeCount | writeID | 1 | 16 |
| pathCount | writeID | 1103 | 9648 |
| edgesInPathCount | CodebookSymbol | 95520 | 169611 |
| edgeId | CodebookSymbol | 401303 | 3071182 |
| faceIndicator | Flag | 401303 | 401303 |
| angle | CodebookSymbol | 401303 | 4750569 |
| TOTAL | | | 8836101 |

The benefit of the Voxel Coordinate Prediction is illustrated in Table 4 and Table 5 which summarize how many bits were spent in the Park scene for the bitstream elements of the diffrValidPathDict( ) payload component. Please note that the labels given by the encoder are used again to name the bitstream elements and that these may deviate from the bitstream element labels defined above.

Thanks to the Inter-Voxel Redundancy Reduction, there are much fewer occurances of the bitstream elements diffrValidPathEdge ("initialEdgeId") and diffrValidPathPath ("pathIndex") which are the main contributors to the size of the diffrValidPathDict( ) payload component for the Park scene in RM1+. Furthermore, in our proposed encoder the transmission of the voxel coordinates requires only a small fraction of the number of bits which were previously necessary.

TABLE 4 diffrValidPathDict( ) payload component of Park scene, RM1+ encoder

| Bitstream element | Type | Number | Bits total |
|---|---|---|---|
| staticSourceCount | UnsignedInteger | 1 | 16 |
| sourceId | writeID | 3 | 24 |
| listenerVoxelCount | UnsignedInteger | 3 | 96 |
| voxelGridIndexX | UnsignedInteger | 119853 | 1917648 |
| voxelGridIndexY | UnsignedInteger | 119853 | 1917648 |
| voxelGridIndexZ | UnsignedInteger | 119853 | 1917648 |
| pathsPerSourceListenerPairCount | UnsignedInteger | 119853 | 1917648 |
| initialEdgeId | writeID | 1318347 | 20021576 |
| pathIndex | UnsignedInteger | 1318347 | 21093552 |
| TOTAL | | | 48785856 |

TABLE 5 diffrValidPathDict( ) payload component
of Park scene, proposed encoder

| Bitstream element | Type | Number | Bits total |
|---|---|---|---|
| hasValidPaths | Flag | 1 | 1 |
| staticSourceCount | writeID | 1 | 8 |
| sourceId | writeID | 3 | 24 |
| codebookVcX | CodebookConfig | 3 | 60 |
| codebookVcY | CodebookConfig | 3 | 75 |
| codebookVcZ | CodebookConfig | 3 | 2241 |
| codebookNumPaths | CodebookConfig | 3 | 237 |
| codebookEdgeId | CodebookConfig | 3 | 5234 |
| codebookPathId | CodebookConfig | 3 | 3761 |
| codebookIndicesRemoved | CodebookConfig | 3 | 237 |
| listenerVoxelCount | writeID | 3 | 72 |
| hasVoxelCoordZ | Flag | 119853 | 119853 |
| voxelCoordZ | CodebookSymbol | 6855 | 39492 |
| hasVoxelCoordY | Flag | 6855 | 6855 |
| voxelCoordY | CodebookSymbol | 5541 | 8838 |
| hasVoxelCoordX | Flag | 5541 | 5541 |
| voxelCoordX | CodebookSymbol | 4884 | 39072 |
| voxelEncodingMode | UnsignedIntege | 119853 | 239706 |
| pathsPerSourceListenerPairCount | CodebookSymbol | 119853 | 141834 |
| initialEdgeId | CodebookSymbol | 23826 | 146291 |
| pathIndex | CodebookSymbol | 23826 | 137858 |
| listIndicesRemovedIncrement | CodebookSymbol | 140199 | 209161 |
| TOTAL | | | 1106451 |

A significant total bitstream saving is achieved. Table 6 lists the saving of total bitstream size in percent. On average, the total bitstream size was reduced by 55.20%. Considering only scenes with mesh data, the total bitstream sizes were reduced by 73.53% on average.

TABLE 6 saving of total bitstream size

| Scene | old total size/ bytes | new total size/ bytes | saving/% |
|---|---|---|---|
| ARBmw | 2227 | 2187 | 1.80% |
| ARHomeConcert_Test 1 | 555 | 515 | 7.21% |
| ARPortal | 19108 | 6879 | 64.00% |
| Battle | 174954 | 75157 | 57.04% |
| Beach | 816 | 776 | 4.90% |
| Canyon | 860305 | 239833 | 72.12% |
| Cathedral | 6474925 | 505521 | 92.19% |
| DowntownDrummer | 217588 | 36410 | 83.27% |
| GigAdvertisement | 938 | 898 | 4.26% |
| Hospital | 3261030 | 1179587 | 63.83% |
| OutsideHOA | 49457 | 12736 | 74.25% |
| Park | 14500165 | 598261 | 95.87% |
| ParkingLot | 952802 | 160090 | 83.20% |
| Recreation | 23516032 | 1772737 | 92.46% |
| SimpleMaze | 498816 | 98395 | 80.27% |
| SingerInTheLab | 5192 | 4830 | 6.97% |
| SingerInYourLab_small | 3451 | 3411 | 1.16% |
| VirtualBasketball | 240432 | 20826 | 91.34% |
| VirtualPartition | 2265 | 620 | 72.63% |

Summarizing, in the above, an improved binary encoding of diffractionPayload( ) and a geometry data converter which avoids re-transmission of static mesh data has been provided. For a test set comprising 19 AR and VR scenes, the size of the encoded bitstreams with the output of the RM1+ encoder has been compared.

Besides the mesh approximation of geometric primitives as part of the geometry data converter and changed numbering of vertices and triangles, the proposed encoding method features only negligible deviations caused by the 24-bit quantization of angular floating point values. All other bitstream elements are encoded losslessly.

In all cases the proposed concepts result in smaller payload sizes. For all "test 1" and "test 2" scenes, the proposed encoding method provides on average a reduction of 55.20% in overall bitstream size over RM1+. Considering only scenes with reflecting mesh data, the proposed encoding method provides on average a reduction of 73.53% in overall bitstream size over RM1+.

Moreover, the proposed encoding method does not affect the runtime complexity of a renderer.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Although each claim only refers back to one single claim, the disclosure also covers any conceivable combination of claims.

REFERENCES

[1] ISO/IEC JTC1/SC29/WG6 M61258 "Third version of Text of Working Draft of RM0", 8th WG 6 meeting, October 2022.
[2] ISO/IEC JTC1/SC29/WG6 M60434 "Core Experiment on Binary Encoding of Early Reflection Metadata", 7th WG 6 meeting, July 2022.

The invention claimed is:

1. An apparatus comprising:
a receiving interface for receiving a plurality of spatial object representations of a plurality of spatial objects, wherein each of the plurality of spatial object representations is represented in at least one of two or more spatial representation domains, and
a converter for converting one or more of the plurality of spatial object representations from a first one of the two or more spatial representation domains into a second one of the two or more spatial representation domains, and
a signal generator for generating one or more audio output signals depending on at least one audio source signal and depending on at least one of the plurality of spatial object representations of at least one object of the plurality of spatial objects, being represented in the second one of the two or more spatial representation domains, wherein the signal generator is configured to generate the one or more audio output signals depending on that the at least one audio source signal is reflected or diffracted at the at least one object.

2. The apparatus according to claim 1, wherein the converter is configured to provide at least two spatial object representations for each of one or more of the plurality of objects.

3. The apparatus according to claim 1, wherein the receiving interface is configured to receive a data stream comprising the plurality of spatial object representations of the plurality of spatial objects and comprising conversion decision information, wherein the converter is configured to select said one or more of the plurality of spatial object representations that are to be converted from the first one of the two or more spatial representation domains into the second one of the two or more spatial representation domains depending on the conversion decision information.

4. The apparatus according to claim 3, wherein the data stream comprises one or more audio source signals, wherein the plurality of objects comprises at least one object, at which at least one audio source signal of the one or more audio source signals is reflected or diffracted, wherein the converter is configured to convert at least one spatial object representation of the at least one audio object from the first one of the two or more spatial representation domains into the second one of the two or more spatial representation domains.

5. The apparatus according to claim 4, wherein the converter is configured to provide at least two spatial object representations for each of one or more of the plurality of objects, wherein for determining the one or more audio output signals, the signal generator is configured to employ a first one of the at least two spatial object representations of each object of the one or more of the plurality of objects, to reproduce the effect of a reflection of at least one of the audio source signals at said object, wherein for determining the one or more audio output signals, the signal generator is configured to employ a second one of the at least two spatial object representations of each object of the one or more of the plurality of objects, to reproduce the effect of a diffraction of at least one of the audio source signals at said object.

6. The apparatus according to claim 5, wherein the converter is configured to convert one or more of the plurality of spatial object representations from the first one of the two or more spatial representation domains, being different from a polygon mesh domain, into the second one of the two or more spatial representation domains, being the polygon mesh domain, wherein an object in the polygon mesh domain is represented by a polygon mesh, wherein the polygon mesh comprises a set of polygons which are connected with each other,
wherein the signal generator is configured to employ the spatial object representation in a spatial representation domain, being different from the polygon mesh domain, of each object of the one or more of the plurality of objects, to take the effect of the reflection of the at least one of the audio source signals at said object into account for determining the one or more audio output signals.

7. The apparatus according to claim 5, wherein the converter is configured to convert one or more of the plurality of spatial object representations from the first one of the two or more spatial representation domains, being different from a polygon mesh domain, into the second one of the two or more spatial representation domains, being the polygon mesh domain, wherein an object in the polygon mesh domain is represented by a polygon mesh, wherein the polygon mesh comprises a set of polygons which are connected with each other,
wherein the signal generator is configured to employ the spatial object representation in the polygon mesh domain of each object of the one or more of the plurality of objects, to take the effect of the diffraction of the at least one of the audio source signals at said object into account for determining the one or more audio output signals.

8. The apparatus according to 7, wherein the polygon mesh domain is a triangle mesh domain, wherein an object in the triangle mesh domain is represented by a triangle mesh, wherein the triangle mesh comprises a plurality of triangles which are connected with each other,
wherein the data stream comprises for an object of the plurality of objects information on a subset of the plurality triangles of the triangle mesh representing the object in the triangle mesh domain, wherein the subset of the plurality of triangles indicates those triangles having one or more vertices where at least one of the one or more audio source signals is diffracted, wherein the signal generator is configured to employ the spatial object representation in the triangle mesh domain of the object, and to consider only vertices of the triangles of the subset of the plurality of triangles of the triangle mesh representing the object to take the effect of the diffraction of the at least one of the audio source signals at the object into account for determining the one or more audio output signals.

9. The apparatus according to claim 1,
wherein the converter is configured to convert one or more of the plurality of spatial object representations from the first one of the two or more spatial representation domains, being different from a polygon mesh domain, into the second one of the two or more spatial representation domains, being the polygon mesh domain, wherein an object in the polygon mesh domain is represented by a polygon mesh, wherein the polygon mesh comprises a set of polygons which are connected with each other.

10. The apparatus according to claim 9,
wherein the polygon mesh domain is a triangle mesh domain, wherein an object in the triangle mesh domain is represented by a triangle mesh, wherein the triangle mesh comprises a plurality of triangles which are connected with each other.

11. The apparatus according to claim 9,
wherein an object, being represented in the first one of the two or more spatial representation domains, being different from the polygon mesh domain, is represented by a single geometric primitive.

12. The apparatus according to claim 11,
wherein the single geometric primitive is three-dimensional.

13. The apparatus according to claim 9,
wherein the polygon mesh domain is a triangle mesh domain, wherein an object in the triangle mesh domain is represented by a triangle mesh, wherein the triangle mesh comprises a plurality of triangles which are connected with each other,
wherein an object, being represented in the first one of the two or more spatial representation domains, being different from the polygon mesh domain, is represented by a single geometric primitive.

14. The apparatus according to claim 13,
wherein the single geometric primitive is three-dimensional.

15. The apparatus according to claim 13,
wherein the single geometric primitive which represents the object in the first one of the two or more spatial representation domains is at least one of a cube, a cuboid, a sphere, a pyramid, a cone, a cylinder and an ellipsoid.

16. A method, comprising:
receiving a plurality of spatial object representations of a plurality of spatial objects, wherein each of the plurality of spatial object representations is represented in at least one of two or more spatial representation domains,
converting one or more of the plurality of spatial object representations from a first one of the two or more spatial representation domains into a second one of the two or more spatial representation domains, and
generating one or more audio output signals depending on at least one audio source signal and depending on at least one of the plurality of spatial object representations of at least one object of the plurality of spatial objects, being represented in the second one of the two or more spatial representation domains, wherein generating the one or more audio output signals is conducted depending on that the at least one audio source signal is reflected or diffracted at the at least one object.

17. A non-transitory computer-readable medium comprising a computer program for implementing the method of claim 16 when being executed on a computer or signal processor.

* * * * *